Patented May 1, 1951

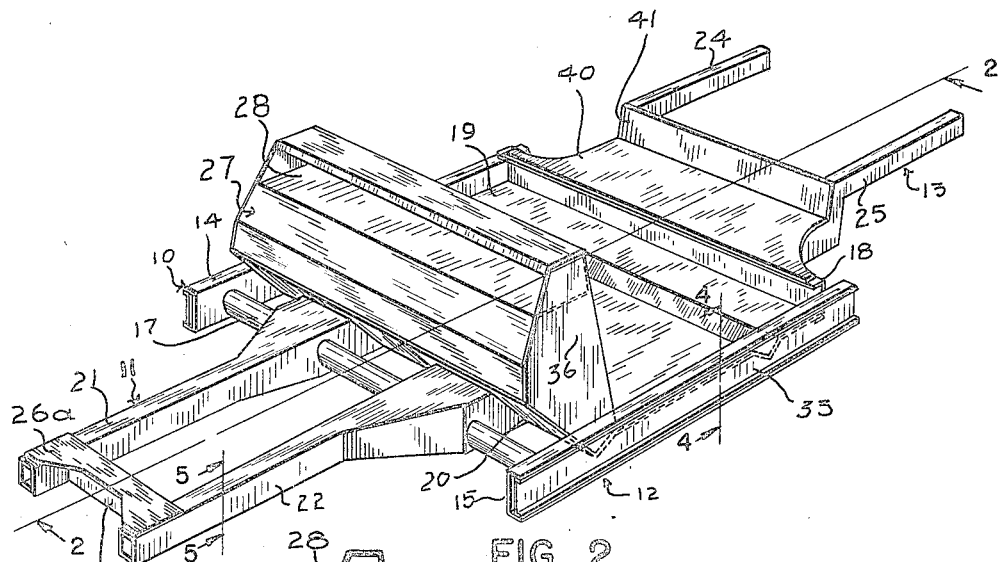

2,551,528

UNITED STATES PATENT OFFICE 2,551,528

MOTOR VEHICLE FRAME

Howard A. Darrin, Los Angeles, Calif.

Application August 18, 1947, Serial No. 769,125

3 Claims. (Cl. 280—106)

The present invention relates to a motor vehicle frame, and more particularly to a frame which is particularly adapted for use in passenger automobiles.

An object of the present invention is to make an improved frame for passenger automobiles.

Another object is to make an improved frame for passenger automobiles with adequate strength, collision resistance, and carrying support for all mechanical features of the automobile as well as passengers.

Another object is to make an automobile frame with separate but strongly interconnected frame elements for supporting mechanism elements of the automobile and a passenger compartment.

Another object is to make an improved automobile frame with narrow front and rear frame sections, and a broad central frame section, the sides of the central frame section extending laterally outward beyond the front and rear sections, the sides of the central frame portion comprising strong shock resisting frame members, the central frame portion having floor portions mounted therein and spaced downwardly from the tops of the side frame members, and acting to strengthen and support other frame elements.

Another object is to make an automobile frame having front and rear portions narrower than a central portion, the sides of the central portion extending laterally outward to the extreme width of an automobile body adapted to be mounted thereon, the central frame portion being rigidly braced by a floor plate mounted intermediately thereof and below the upper edge of the side frame members.

Another object is to make an automobile frame member having hollow longitudinal frame members opening at their forward end to the atmosphere and at their rearward end through a floor element to provide ventilating air to a passenger seating area.

These and other objects of the invention will be more fully set forth in the following description and in the accompanying drawings, comprising two sheets. In the drawings:

Fig. 1 is a vew in perspective of an automobile frame embodying the present invention;

Fig. 2 is a longitudinal vertical sectional view taken on the line 2—2 of Fig. 1;

Fig. 3 is a plan view of the frame illustrated in Figs. 1 and 2;

Fig. 4 is an enlarged sectional view taken on line 4—4 of Fig. 1, showing how a floor plate and a channel closure sheet are secured to a side frame member; and Fig. 5 is a similarly enlarged sectional view taken on the line 5—5 of Fig. 1, illustrating particularly a ventilating duct element which also constitutes an engine support element.

Referring to the drawings in detail, an automobile frame 10 comprises a forward section 11, a central passenger supporting section 12, and a rear section 13. The central passenger supporting section 12 comprises two outwardly facing channeled side members 14 and 15, secured together by front and rear transverse frame members 17 and 18. The front transverse frame member 17 is circular in section, while the rear transverse frame member comprises a steel channel. The side frame members are secured to these transverse members, as by welding.

A floor plate 19 is fitted closely between the side frame members 17 and 18, and is welded at its longitudinal edges to the side frame members. A V-shaped troughed recess is provided in the floor plate on a line adapted to receive the heels of passengers seated in the rear seat of an automobile body, not shown, mounted on the frame, while a generally similar recess is provided across the forward portion of the floor plate. The forward end of the floor plate forming this recess extends upwardly as at 20 to form a forwardly sloping foot support for occupants of the front seat.

A pair of forward frame members 21 and 22 are of box section with round openings transversely therethrough of a size to receive the forward transverse frame member 17 therein. The rearward ends of these forward frame members are beveled at an angle to coincide with the slope of the forward portion 20 of the floor plate; to which, and to the forward transverse frame member 17, they are secured, as by welding.

A hole 23 is cut in the floor plate over the inner end of each of these box-like frame members, and the automobile body adapted to be mounted on this frame preferably is provided with openings forwardly of these frame members so that a ram effect will be created, when the automobile in which the frame is mounted is in motion. This produces an inflow of air through the box-like frame members and into the interior of the automobile. Each of these box-like frame members preferably is made of a U-shaped channel with the open side covered with a plate by welding, as shown in Fig. 5. This greatly simplifies the structure of these members and permits their fabrication by ordinary sheet metal tools without the use of costly formed or extruded sections.

A transverse bracing member 26 is mounted between the forward end portions of the forward frame members 21 and 22, and a plate 26a is secured across the upper surface of this transverse bracing member and the forward ends of the frame members 21 and 22.

A pair of rear frame extensions 24 and 25, which also may be fabricated from box section material, are secured, as by welding, to the rear transverse frame member 18 to extend rearwardly therefrom.

A dash plate 27 is secured in position transversely of the forward end of the frame. The dash member extends upwardly from the upper forward end of the floor plate 19. The upper portion of this dash member is bent into the form of a forwardly opening channel 28. Instruments and control elements, such as light switches and the like, are mounted within the channel, to have their faces exposed through openings, not shown, in the vertical portion of this channel, so that the casings, of these instruments will be exposed within the channel 28 when a hood of the automobile (not shown) is raised for servicing. In this manner, the instruments are readily accessible to a mechanic having access to the engine or forward hooded compartment, but are not readily accessible to one having access merely to the passenger compartment of the automobile. Thus, if the hood is locked in a usual manner, the instruments are mounted within the channel 28 and are protected against tampering. Also, they are protected from accidental damage by a passenger's feet, such as sometimes occurs when a passenger in the front seat crosses his legs or inadvertently raises his foot into the instrument area.

Side plates 36 are mounted one on each side of the dash member, as illustrated in Figs. 1 and 2, and are welded to the dash member, the floor plate 19 and the side frame members to make a strong box frame structure. A rear cover and frame bracing plate 40 is secured across the tops of the rear frame members 24 and 25, terminating in an upturned flange 41 which is secured to vertical offsets in these frame members.

Front wheels 29 and 30 and rear wheels 31 and 32 may be mounted on the frame in a usual or desired manner.

A closure sheet 33 having outwardly flanged upper and lower edge portions 34 and 35 is mounted in the open outer side of each of the longitudinal side frame members 14 and 15. The sheet metal of the upper body portion, indicated in dotted lines in Fig. 4, also has the lower edge thereof flanged as at 38 in a similar manner.

Decorative channel strips 38 and 39 are mounted over the joined edges of the side channel members 14 and 15 and their associated body and closure sheet members, as shown in Fig. 4, so as to form an ornamental trim strip for this portion of the body. The longitudinal side frame members, it will be apparent, provide tremendous strength against lateral impact which might be produced by collision or other accident.

The present automobile frame structure is simple and easy to fabricate from standard plates and structural shapes, is of tremendous strength, provides for low, comfortable seating of the occupants, protects them from injury, and provides simple and adequate mounting facilities for all mechanical equipment. Also, it provides a controllable source of forced ventilation at all times when the automobile is in motion, and thoroughly seals against the entrance of fumes and road dust upwardly into the interior of the car, which frequently occurs through and around the edges of the floor area of most present passenger automobiles.

I claim:

1. An automobile chassis frame having relatively narrow front and rear sections and a wide substantially rectangular central frame section, the sides of said central frame section being adapted to have a body side member secured directly thereto, a floor plate mounted between the side members of said central frame section, a major portion of said floor plate being located below the tops of the side frame members, said floor plate being firmly secured along its lateral edges to said side frame members, a front end portion of said floor plate sloping upwardly and forwardly to a height above said side frame members, a dash formed to extend upwardly from the upper forward edge of said floor plate, said dash having a forwardly opening channel therein of a size to house instruments therein, and a pair of enclosing side plates mounted one on each side of said dash and a forward upwardly sloping portion of said floor plate to conform to the edges thereof and fixedly secured to said edges, the lower end portions of said side plates being adjacent to and secured to said central frame section side frame members.

2. An auto frame comprising a medial body supporting frame whose side members define the width of said automobile, a floor plate secured at its side edges to the inner side surface of said side members, and forwardly and rearwardly projecting wheel carrying portions secured to the front and rear portions respectively of said frame; said floor plate having a front forwardly and upwardly disposed portion providing a dash and a transverse V-shaped foot receiving depression between said dash and the rearwardly contiguous portion of said floor plate.

3. An auto frame comprising a medial body supporting frame whose side members define the width of said automobile, a floor plate secured at its side edges to the inner side surface of said side members, said floor plate having a front forwardly and upwardly disposed portion providing a dash, said dash having a pair of transversely spaced openings therethrough, rear wheel carrying portions secured to and extending rearwardly from said frame, and a pair of tubular front wheel carrying members secured between their ends to the front portion of said frame and secured at their rear ends to said dash in communication with said respective openings, whereby air may pass through said tubular members and through said openings.

HOWARD A. DARRIN.

REFERENCES CITED

The following references are of record in the file of this patent:

UNITED STATES PATENTS

| Number | Name | Date |
|---|---|---|
| 2,058,923 | Swallow | Oct. 27, 1936 |
| 2,108,215 | Stief et al. | Feb. 15, 1938 |
| 2,193,949 | Tibbetts | Mar. 19, 1940 |
| 2,301,330 | Schafer | Nov. 10, 1942 |
| 2,347,141 | Werdehoff | Apr. 18, 1944 |

FOREIGN PATENTS

| Number | Country | Date |
|---|---|---|
| 365,150 | France | June 19, 1906 |
| 662,142 | France | Mar. 18, 1929 |